(12) United States Patent
Disegni et al.

(10) Patent No.: US 8,461,909 B2
(45) Date of Patent: Jun. 11, 2013

(54) VOLTAGE BOOSTER

(75) Inventors: Fabio Enrico Carlo Disegni, Spino d'adda (IT); Marco Spampinato, Messina (IT)

(73) Assignee: STMicroelectronics S.R.L., Agrate Brianza (IT)

(*) Notice: Subject to any disclaimer, the term of this patent is extended or adjusted under 35 U.S.C. 154(b) by 0 days.

(21) Appl. No.: 13/340,118

(22) Filed: Dec. 29, 2011

(65) Prior Publication Data

US 2012/0169408 A1 Jul. 5, 2012

(30) Foreign Application Priority Data

Dec. 30, 2010 (IT) .......................... M12010A002457

(51) Int. Cl.
*G11C 5/14* (2006.01)
(52) U.S. Cl.
USPC ........................................................ 327/530
(58) Field of Classification Search
USPC ........................................ 327/530, 534–537
See application file for complete search history.

(56) References Cited

U.S. PATENT DOCUMENTS

| | | | |
|---|---|---|---|
| 5,978,283 A | 11/1999 | Hsu et al. | |
| 6,137,344 A | 10/2000 | Miki | |
| 2003/0184360 A1 | 10/2003 | Wang et al. | |
| 2008/0067647 A1* | 3/2008 | Fukuda | 257/676 |

FOREIGN PATENT DOCUMENTS

WO 0124348 4/2001

OTHER PUBLICATIONS

D'Arrigo et al., "Nonvolatile memories", ISSCC 89, IEEE International Solid-State Circuits Conference, Feb. 1989, pp. 1-3.

* cited by examiner

*Primary Examiner* — Lincoln Donovan
*Assistant Examiner* — Sibin Chen
(74) *Attorney, Agent, or Firm* — Allen, Dyer, Doppelt, Milbrath & Gilchrist, P.A.

(57) ABSTRACT

A voltage booster device may include a plurality of multiplication stages arranged in a sequence so that an input terminal of each multiplication stage, with the exception of a first multiplication stage, is connected to an output terminal of a previous multiplication stage. Each multiplication stage may include pumping circuitry for accumulating an electric charge proportional to a pump voltage value of the multiplication stage. Each multiplication stage may also include a phase signal generating circuit for switching the multiplication stages between a transfer phase and a maintaining phase. In at least one of the stages, the pumping circuitry may include at least two series connected charge accumulators. A terminal may be shared between the charge accumulators and may be connected through biasing circuitry to an output terminal of a previous multiplication stage for forcing the charge accumulators within a threshold potential drop value.

27 Claims, 4 Drawing Sheets

VOLTAGE BOOSTER

FIELD OF THE INVENTION

The present invention relates to the field of the voltage booster electronic circuits. More specifically, this invention relates to charge pumps.

BACKGROUND OF THE INVENTION

The widespread diffusion of portable electronic devices, such as, mobile telephones, PDAs, or portable personal computers, including a plurality of integrated systems powered by batteries, has directed research towards approaches that allow a greater reduction in power consumption to prolong their operative functioning. To achieve this goal, reduction of the operating voltage (voltage scaling) of the components included in portable electronic devices has been started, which has made it possible to develop low power consumption systems.

However, due to some operative specifications, it may not be possible to reduce the operating voltage of some of the electronic systems included in a portable integrated electronic system, such as, for example, EEPROM and FLASH type memories, which typically require absolute voltage values (both positive or negative in sign). These absolute voltage values are typically higher than the voltage value that supplies the portable integrated electronic system where they are integrated, to properly perform the write and erase operations.

To address this, integrated electronic circuits known as voltage boosters have been produced. A voltage booster is a circuit that generates a voltage higher than the absolute value of the voltage supplied thereof. The most diffused type of voltage booster may be a charge pump. Charge pump voltage boosters, or more simply charge pumps, are formed by a plurality of cascaded multiplication stages, each including a corresponding pumping capacitor. The operation of a charge pump is based on charge maintaining and transfer phases in the sequence of pumping capacitors, which are interconnected through a corresponding switching elements, such as MOS transistors or diodes.

In particular, each pumping capacitor has a plate connected to a free terminal, which is controlled by a control signal that periodically switches between a low voltage and a high voltage. The control signals of pumping capacitors of adjacent stages are in mutual phase opposition. In this way, in the case of positive charge pumps (i.e. configured to provide a positive output voltage) when the control signal is at the low voltage value, the pumping capacitor is charged by the pumping capacitor of the previous stage in the cascade of multiplication stages. When the control signal switches to the high voltage value, an accumulated electric charge is transferred to the pumping capacitor of the next multiplication stage in the cascade. Conversely, in the case of negative charge pumps (i.e. configured for providing a negative output voltage) when the control signal is at the low voltage value, the pumping capacitor receives a charge accumulated in the pumping capacitor of the next multiplication stage in the cascade. When the control signal switches to the high voltage value, the accumulated electrical charge is transferred to the pumping capacitor of the previous multiplication stage in the cascade.

Each multiplication stage included in a charge pump is configured to provide, at its output, a multiple (positive or negative in sign) of a pump voltage provided by the integrated electronic system (e.g., the supply voltage). In more detail, the absolute value of an output voltage of a multiplication stage subsequent the first charge pump is typically equal to the pump voltage multiplied by the number of the previous multiplication stages of the charge pump plus one. Consequently, the voltage supplied by the charge pump increases substantially linearly with the number of multiplication stages within the same.

The pumping capacitor of each multiplication stage is located by the output terminal of the same stage to output the voltage corresponding to the electric charge accumulated on its plates. Consequently, at any stage subsequent a first multiplication stage of the cascade of multiplication stages, the value of a potential drop that is developed between the terminals of the pumping capacitor is substantially equal to the output voltage value of the multiplication stage, and increases substantially linearly with the number of multiplication stages. Such potential drop may become higher than a maximum voltage value that usually defines a limit of an area of safe operation, or SOA (Safe Operating Area).

The SOA is defined as the set of current and voltage conditions for which an integrated electronic system can function without being subjected to excessive stress or suffer irreparable damages. In more detail, the SOA is limited by a maximum voltage value and by a maximum current value, the product of which provides a safe operating maximum power. In addition, electronic devices operating in proximity of such voltage and/or current values suffer a reduction of their useful life due to the stress they are subjected.

SUMMARY OF THE INVENTION

In general terms, the approach according to one or more embodiments of the present invention has the object of providing an improved charge pump in such a way that elements included in the same operate within their SOA for the whole operation of the charge pump.

In particular, one or more aspects of the approach according to specific embodiments of the invention are set out in the independent claims, with advantageous features of the same approach that are set forth in the dependent claims.

More specifically, one aspect of an approach according to an embodiment provides a voltage booster device, particularly of a charge pump type. The voltage booster device includes a plurality of multiplication stages arranged in a sequence, so that an input terminal of each multiplication stage, with the exception of a first multiplication stage, is connected to an output terminal of a previous multiplication stage. Each multiplication stage includes pumping means or circuitry for accumulating an electrical charge proportional to a pump voltage value of the multiplication stage. Each stage also includes a multiplication circuit for generating phase signals to switch the operation of multiplication stages of a transfer phase and a maintaining phase, so that multiplication stages located in a even position in the sequence operate in the transfer phase when multiplication stages located in an odd position in the sequence operate in the maintaining phase, and vice-versa.

According to one embodiment, in at least one of the stages in an even/odd position in the sequence, the pumping means or circuitry includes at least two charge accumulators connected in series. A common terminal to the at least two charge accumulators is connected by biasing means or circuitry to an output terminal of a previous multiplication stage in even/odd position in the sequence for forcing the operation of the charge accumulators within a maximum potential drop value.

Another aspect relates to a corresponding method for operating a voltage booster device. According to one or more embodiments, as well as additional features and related advantages will be better understood with reference to the following detailed description of some embodiments thereof, provided merely by way of exemplary and non-limitative purposes, to be read in conjunction with the attached drawings (where corresponding elements are designated with the same or similar references and their explanation is not repeated for sake of brevity). In this regard, it is expressly understood that the figures are not necessarily to scale (with some details that may be exaggerated and/or simplified) and, unless otherwise stated, they are used to conceptually illustrate the described structures and procedures.

DETAILED DESCRIPTION OF THE PREFERRED EMBODIMENTS

Figure 1A:
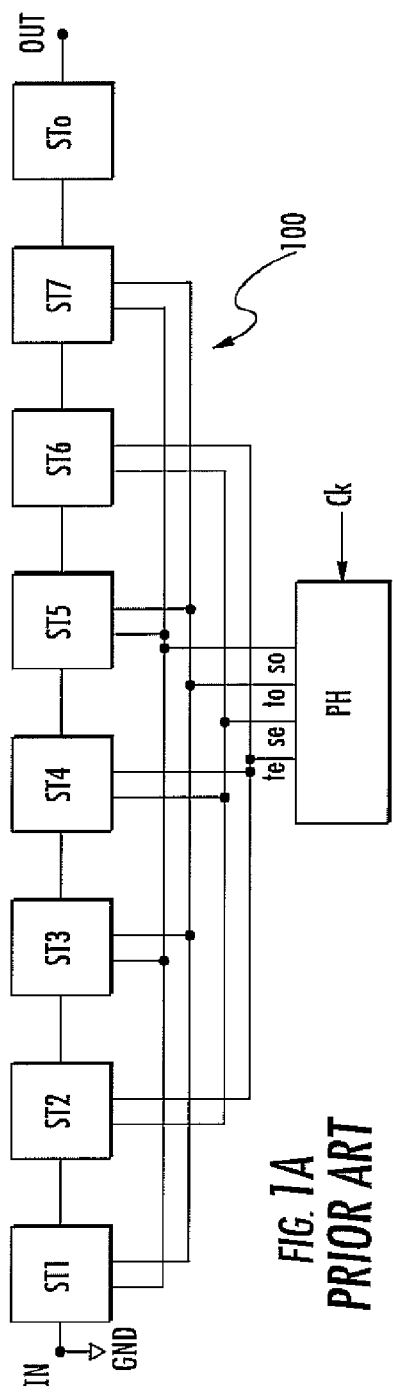
FIG. 1A is a functional block diagram of a generic charge pump multiplier according to the prior art.

FIG. 1A is a functional block diagram of a generic charge pump multiplier, or more simply a charge pump 100, according to an implementation known in the art. The charge pump 100 is adapted to be integrated into an integrated electronic system, such as, a memory of flash type. More particularly, the charge pump 100 is a negative charge pump, i.e., adapted to generate and provide at its output OUT a voltage lower than a reference voltage, e.g. the ground voltage GND—provided to its input IN—of the integrated electronic system wherein the charge pump 100 is implemented.

The charge pump 100 has a modular structure including a succession of multiplication stages STi, with the index i that goes from 1 to n, where n is the number of multiplication stages (in the example in FIG. 1A n=7), an output stage STo, and a phase signals generating circuit PH.

Figure 1B:
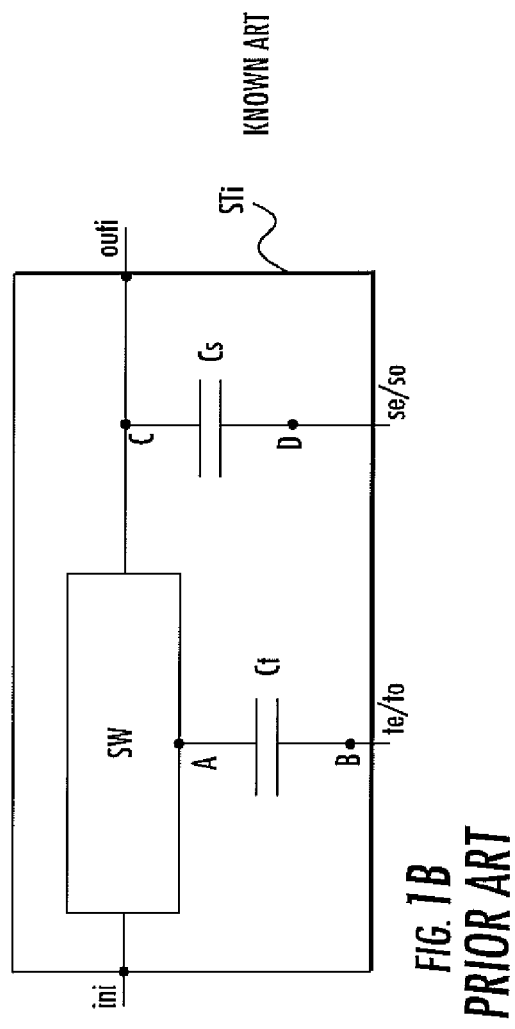
FIG. 1B is a schematic block diagram of a generic multiplication stage included in the charge pump of FIG. 1A.

Each generic multiplication stage STi, a schematic diagram of which it is shown in FIG. 1B, includes a switching circuit SW which is actuated to discriminate the alternating between charge maintaining and transfer operating phases, as will be described below. The switching circuit SW includes an input terminal corresponding to an input terminal ini of the multiplication stage STi, and an output terminal corresponding to an output terminal outi of the multiplication stage STi. Moreover, a control terminal of the switching circuit SW is connected to a first terminal A of a conditioning capacitor Ct. A second terminal B of such conditioning capacitor Ct receives a transfer signal te or to, provided by the phase signal generation circuit PH, according to the index i is even or odd, respectively. The multiplication stage STi also includes a pumping capacitor Cs for accumulating an electrical charge for the operation of the charge pump 100. The pumping capacitor has a first terminal C connected to the output terminal outi and a second terminal D receiving an accumulation signal se or so according to whether the stage STi (and hence the index i) is even or odd, respectively. The storage signals se and so are generated by the phase signals generation circuit PH.

The pumping Cs and conditioning Ct capacitors are preferably integrated devices, which can be implemented using MOS transistors in a MOS capacitor configuration, with a control terminal (gate) that forms the terminal C of the pumping capacitor Cs, and interconnected conduction terminals (source and drain), to form the terminal D. A further method of implementation of the pumping Cs and/or conditioning Ct capacitors provide to form such capacitors through two areas formed in stacked polysilicon layers with a layer of insulating material interposed (e.g. silicon dioxide). However, any known implementation method of integrated capacitors is applicable.

Each multiplication stage STi is arranged in a sequence, called the cascade, in which it is connected—with the exception of a first multiplication stage ST1—by its input terminal ini to the output terminal outi−1 of the previous multiplication stage STi−1, and the input terminal ini+1 of the next multiplication stage STi+1 through its output terminal outi—with the exception of a last multiplication stage ST7. In addition, the first multiplication stage ST1 is connected by the input terminal in1—corresponding to the input IN of the charge pump 100—to a reference terminal for receiving the ground voltage GND, and the output terminal out of the last multiplication stage ST7 of the cascade is connected to an input terminal of the output stage STo.

Finally, an output terminal of the output stage STo corresponds to the output OUT of the charge pump 100. The output stage STo includes stabilization elements (i.e., high-capacity capacitors) to provide an output voltage from the charge pump 100 substantially constant over time, even with a high absorption/supplying of electrical charge by electronic devices connected to the output OUT of the charge pump 100.

The phase signal generation circuit PH receives a clock signal Ck (for example, the clock signal that cadences the operation of the integrated electronic system), and generates the accumulation signals se and so and the transfer signals te and to. For example, the accumulation signals se and so are asserted to an accumulation voltage value Vs equal to 1-3V and de-asserted to the ground voltage GND. Similarly, the transfer signals te and to are asserted to a transfer voltage value Vt equal to 1-3V and de-asserted to the ground voltage GND. In particular, the signals se and te are generated so as to reduce time overlapping with respect to the signals so and to so that adjacent multiplication stages STi (i.e., with the index i even and odd) will not be in the same operating phase during the operation of charge pump 100.

The charge pump 100 operates as follows. The phase signal generation circuit PH asserts the signals to and so to impose the transfer phase in the multiplication stages STi in odd positions in the cascade (i.e. the multiplication stages STi having odd index i), while the signals te and se are de-asserted to impose the maintaining phase in the multiplication stages STi in even position in the cascade (i.e. the multiplication stages STi with even index i). Subsequently, the phase signal generation circuit PH de-asserts the signals to and so and asserts the signals te and se, imposing the maintaining phase in the multiplication stages STi in odd positions in the cascade, and imposing the transfer phase in the multiplication stages STi in even position in the cascade.

In more detail, the transfer signal to is asserted to the value of transfer voltage Vt in such a way that the switching circuit SW connects the terminal ini with the terminal outi of the multiplication stages STi in odd positions in the cascade. This imposes to the terminal C of the capacitor Cs, a voltage value equal to a pump voltage value Vi−1 provided by the previous multiplication stage STi−1 (which is in the maintaining phase)—or the ground voltage GND provided by the reference terminal in the case of the first multiplication stage ST1. The accumulation signal so is then asserted to the accumulation voltage value Vs. Therefore, a potential drop ΔVs equal to −(|Vi−1|+Vs)—or equal to −(GND+Vs) is developed in the case of the first stage ST1—between terminals C and D of the capacitors Cs of the multiplication stages STi in odd positions in the cascade, causing a charge outflow from the capacitor Cs to the input terminals of the respective multiplication stages STi, i.e. the pumping capacitors Cs of the stages in even position in the cascade—or towards the reference terminal in the case of the first stage ST1.

Subsequently, the signals so and to are de-asserted so that the switching circuit SW isolates, between each other, the input ini and output outi terminals of the multiplication stages STi which occupies odd position in the cascade. In this way, the multiplication stages STi in odd positions in the cascade enter the maintaining phase and at their terminals outi a pump voltage value Vi is obtained that may be substantially equal to the value of the potential drop ΔVs. At the same time, the transfer signal te is asserted and is then asserted the accumulation signal se, with the result that the operation above-described is repeated also for the multiplication stages STi that occupy an even position in the cascade. Otherwise, the output stage STo transfers, unchanged, the pump voltage value V7 from its input terminal to the output OUT of the charge pump 100 during the entire steady operation.

The conditioning capacitors Ct have the purpose of ensuring proper biasing of the switching circuits SW during the operation of charge pump 100. In more detail, with the progress of the cascade each multiplication stage STi has at its input ini and output outi terminals, intermediate voltages values Vi and Vi−1, respectively, are higher in absolute value than those associated with previous multiplication stages STi. To ensure the proper activation of the switching circuit SW (and thus the ability to transfer the voltages to the input ini and output outi terminals) it may be desirable to provide specific transfer signals to or te according to the intermediate voltage value Vi−1 and Vi present at the input ini and output outi terminals of each multiplication stage STi. This would lead to a disadvantageous increase in the complexity of the phase signals generation circuit PH. In the art it may be known to adjust the transfer signal te or to through the use of the conditioning capacitor Ct at the respective pump voltage value Vi of each stage STi, using the same transfer voltage value Vt for the transfer signal te or to of each multiplication stage STi. In this way the transfer signal to or to is shifted to a voltage value such that each switching circuit SW is able to operate properly.

During the steady operation of the charge pump 100, in the maintaining phase, on the terminal C of the pumping capacitor Cs of each multiplication stage STi there is the pump voltage value Vi in absolute value proportional to the voltage value Vs of the accumulation signal se or so multiplied by the index i of the multiplication stage STi, and negative in sign. During the transfer on the terminal C, there is the pump voltage value Vi−1, and on the terminal D there is the accumulation voltage value Vs. Therefore, during the entire steady operation of the charge pump 100 between the terminals of the pumping capacitor Cs, there is a potential drop ΔVs equal to the difference between the voltage values present at terminals C and D of the pumping capacitor Cs. The value of the potential drop ΔVs may be substantially equal to the pump voltage value Vi.

However, there is typically a maximum potential drop value ΔVM (e.g., equal to 10-20V) tolerable by the capacitors Cs, crossed which the latter are subjected to a relatively high stress and may suffer irreparable damages. In charge pumps with a high number of stages, it may happen that the value of the potential drop on the pumping capacitors of multiplication stages in advanced positions in the cascade (next to the output OUT of the charge pump 100) is in a neighbourhood of, or exceeds, the maximum potential drop value ΔVM. In the charge pump 100, for example, such maximum value may be reached at the multiplication stage ST7—henceforth referred to as the "critical stage". The capacitor Cs of the critical stage ST7 may have to operate above the maximum potential drop value ΔVM, being therefore subjected to a high stress. This makes damaging the capacitor Cs possible, and, in any case, may reduce its "useful life" (i.e., a period having as ends a first activation and an irreparable damage) as compared to the useful life of the capacitor Cs included in the remaining multiplication stages STi of the charge pump 100 (which may not be subject to an equally high potential drop ΔVs). Once the useful life of the capacitor Cs of the ST7 critical stage expires, the charge pump 100 will cease to function. In other words, the lifetime of the charge pump 100 corresponds to the useful life of the capacitors Cs subjected to greatest stress during operation (i.e., The pumping capacitor Cs of the critical stage ST7 in the charge pump 100). It therefore may be desirable to resolve the problem set forth above to prolong the useful life of the charge pump 100.

Figures 2A, 2B:
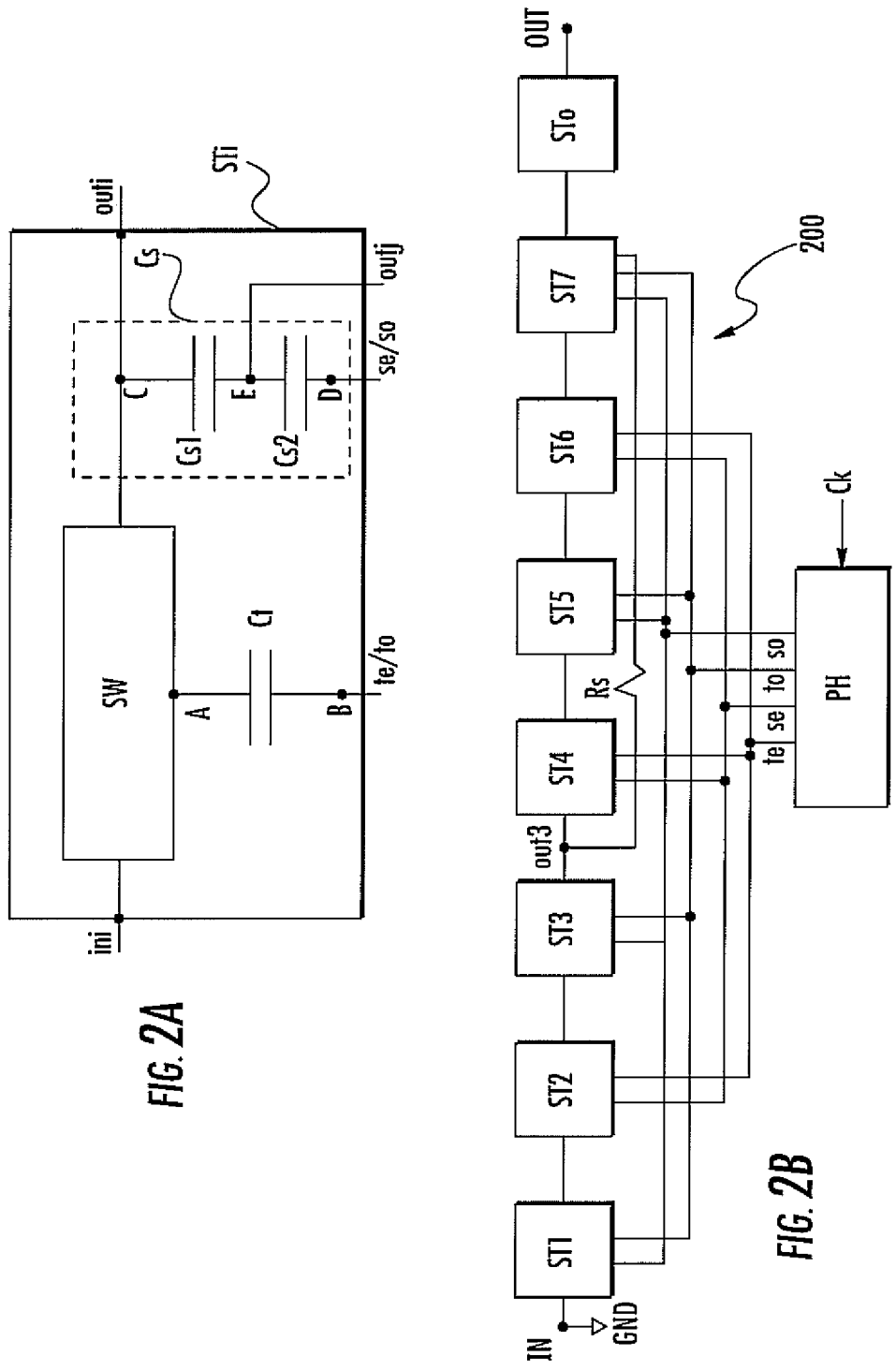
FIG. 2A is a schematic block diagram of a critical multiplication stage according to an embodiment of the present invention.
FIG. 2B is a functional block diagram of a charge pump according to an embodiment of the present invention.

As shown in FIG. 2A, wherein a schematic circuit diagram of a critical multiplication stage STi according to an embodiment is illustrated, the single pumping capacitor Cs is replaced with two capacitors Cs1 and Cs2 in series. In more detail, a first capacitor Cs1 is arranged between the terminal C of the capacitor Cs and an intermediate terminal E, while a second capacitor Cs2 is placed between terminal E and the terminal D of the capacitor Cs. Each capacitor Cs1 and Cs2 divides the potential drop ΔVs in potential drops ΔVs1 and ΔVs2 (between terminals C, E and E, D, respectively) below the maximum potential drop value ΔVM, and at relatively the same time, so that the series of two capacitors Cs1 and Cs2 has an equivalent capacity equal to a desired capacity for the pumping capacitor Cs.

For example, the two capacitors Cs1 and Cs2 may be formed with substantially equal capacity of twice the value of the desired capacity for the pumping capacitor Cs (e.g., each with a capacity equal to 6 pF obtaining an equivalent desired capacity of 3 pF for the pumping capacitor Cs formed by their series), in such a way that the potential drop ΔVs is divided into two potential drops ΔVs1 and ΔVs2 (between terminals C-E and E-D, respectively) of substantially equal value and lower than the maximum potential drop value ΔVM.

However, in an electronic device characterized by a high number of switching (e.g., greater than 1 MHz) during its operation (such as in the case of the charge pump 100) it may be disadvantageous to have a floating terminal, such as the terminal E. In fact, during the operation of the charge pump 100, the charge distribution between the capacitors Cs1 and Cs2 could be uneven (e.g., due to leakage currents and/or to a reduced symmetry or "mismatch" between the capacitors Cs1 and Cs2) and, thus, also the potential drop ΔVs that develops between terminals C and D could not be distributed evenly.

For example, on one of the two capacitors Cs1 or Cs2, the potential drop ΔVs1 or ΔVs2 may result in a value higher than the maximum potential drop value ΔVM, with the consequent disadvantages associated with this event.

To address the above-described problem, it is possible to bias, to a static voltage value, the floating terminals. For example, such biasing could be obtained by using a ladder network (structure known in the art and therefore not described for sake of brevity). However, this expedient applied to charge pump 100 may have a significant cost in terms of used area for implementing a plurality of resistors included in the ladder network, and would greatly increase the static electric power consumption of the charge pump 100. At the same time, the plurality of resistors may form a resistor-capacitor network able to reduce the operating speed of the charge pump 100. These disadvantages are significant, especially in the case where the integrated electronic system which includes the charge pump 100 is of portable type.

FIG. 2B shows a block diagram of a charge pump 200 according to an embodiment. Such charge pump 200 allows dynamically biasing of the terminal E with low area consumption and with reduced additional electrical power consumption thereof. The charge pump 200 differs from the charge pump 100 shown in FIG. 1A as follows. In the charge pump 200 the pumping capacitor Cs implemented in the critical stage STi (in the example in FIG. 2B the critical stage ST7). It is formed as described with reference to FIG. 2A, i.e. includes two capacitors Cs1 and Cs2 connected in series. The intermediate terminal E is connected by a resistor Rs to the output terminal outj—where the index j is defined as an even or odd number according to whether the index i is an even or odd number, respectively (with, j<i)—of a previous multiplication stage STj in even or odd position according to whether the critical multiplication stage STi occupies a odd or even position in the cascade, respectively. The resistor Rs can be formed, for example, through an area of doped polysilicon. However, any other resistor type is equally applicable, for example, the resistor Rs may be implemented using a MOS-type transistor properly biased in a triode region of operation, so that between its conduction terminals there is an equivalent resistance equal to a desired resistance for the resistor Rs.

In the charge pump 200 the index j has been selected, for example j=3. Consequently, the resistor Rs connects the output out3 of the previous multiplication stage ST3 and through a second terminal to the terminal E of the capacitor Cs of the seventh stage ST7. During the operation of the charge pump 200, the resistor Rs transfers a voltage Vout3($t$) from the output terminal out3 to the intermediate terminal E. Such voltage Vout3($t$) oscillates between the voltage value V3 in the maintaining phase and the voltage value V2 in transfer phase.

In addition, the stages ST3 and ST7 operate in phase synchrony (i.e., their transfer and accumulation phases are substantially simultaneous, both stages ST3 and ST7 receiving the signals so and to). The phase synchrony implies that trends versus time of the voltages at the terminals out3 and D of the previous multiplication stage ST3 are consistent with trends versus time of voltages at terminals out7 and D of the critical stage ST7. In particular, the voltage Vout3($t$) forced to the intermediate terminal E oscillates in phase synchrony with the voltages on the terminals C and D of the critical stage ST7. In other words, the voltage Vout3($t$) dynamically biases the intermediate terminal E during the operation of the charge pump 200. Consequently, the value of the potential drop ΔVs2 on Cs2 may be limited to a value proportional to the value of the voltage Vout3($t$) generally lower than the maximum potential drop value ΔVM. The value of the potential drop ΔVs1 may also be limited by the value of the voltage Vout3($t$) to the intermediate terminal E to a value lower than ΔVM.

Moreover, due to the phase synchrony, a potential drop ΔVRs between the terminals of the resistor Rs is of limited value (e.g., lower than a voltage contribution supplied by each individual multiplication stage STi) during the operation of the charge pump 200. The value of the potential drop ΔVRs allows the resistor Rs to be sized with a limited resistance (e.g., a resistance lower than or equal to 100 kΩ), thus without significantly reducing the speed of the circuit, without an excessive additional area consumption, and with an additional low electrical power dissipation (e.g., in the order of μW).

Figure 3A:
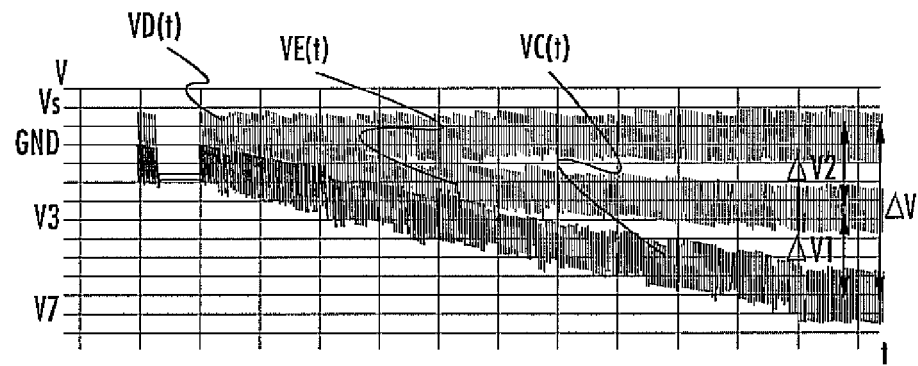
FIG. 3A is a plot of the simulated trend versus time of the potential drop between the terminals of the pumping capacitor included in a critical multiplication stage of the charge pump of FIG. 2A during a power on thereof.

FIG. 3A shows a simulated trend versus time of voltages at the terminals C, D and E of the pumping capacitor Cs included in the critical stage ST7, during a power on of the charge pump 200. At the terminal D a voltage VD(t) (corresponding to the accumulation signal so) oscillates between the ground voltage GND and the accumulation voltage value Vs, while at the terminals E and C respective voltages VE(t) and VC(t) start from an initial value substantially equal to the ground voltage GND, and then lines up to the corresponding intermediate voltage values V3 and V7. In particular, it is to be observed how the potential differences VC(t)–VE(t) and VE(t)–VD(t) (corresponding to the potential drops LVs1 and ΔVs2, respectively) divide the potential difference VC(t)–VD(t) (corresponding to the potential drop ΔVs) without assuming a value higher than the maximum potential drop value ΔVM ever.

Figure 3B:
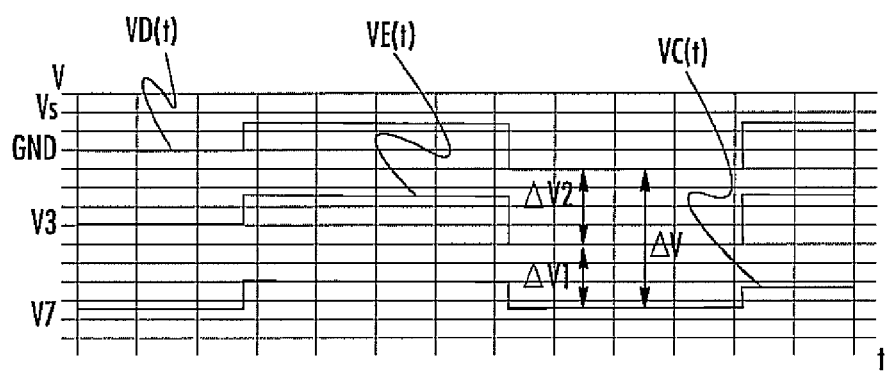
FIG. 3B is a plot of the simulated trend versus time of the potential drop between the terminals of the pumping capacitor included in a critical multiplication stage of the charge pump of FIG. 2A during a steady operation thereof.

FIG. 3B shows the trend versus time of the voltages at terminals C, D and E of the pumping capacitor Cs included in the critical stage ST7, during a steady operation of the charge pump 200. At the terminal D, the voltage VD(t) oscillates between the ground voltage GND and the accumulation voltage value Vs, while at the terminals E and C the voltages VE(t) and VC(t) oscillate between the pump voltages values V3 and V7 and the pump voltages plus a voltage value substantially equal to the accumulation voltage Vs, respectively, in the maintaining phase and in the transfer phase (according to the accumulation signal so).

In particular, it is to be observed how the potential differences VC(t)–VE(t) and VE(t)–VD(t) (corresponding to the potential drops ΔVs1 and ΔVs2, respectively) divide the potential difference VC(t)–VD(t) (corresponding to the potential drop ΔVs) in such a way that on the capacitors Cs1 and Cs2 a potential drop of ΔVs1 and ΔVs2 near the maximum potential drop value ΔVM that may be possibly harmful, or that may cause an excessive stress, is not developed.

From what is above described, each conditioning capacitor included in the critical stages also experiences a voltage drop in value substantially equal to the pump voltage value of the respective critical stage, rather then higher than the maximum potential drop value ΔVM. For example, considering FIGS. 1A and 2B, the conditioning capacitor of the critical stage ST7 experiences a voltage drop ΔVt between terminals A and B equal to the voltage pump value V7 higher than the maximum potential drop value ΔVM. In other words, the conditioning capacitor is subjected to a high stress, with the same disadvantages set forth above regarding the pumping capacitor Cs.

Figure 4A:
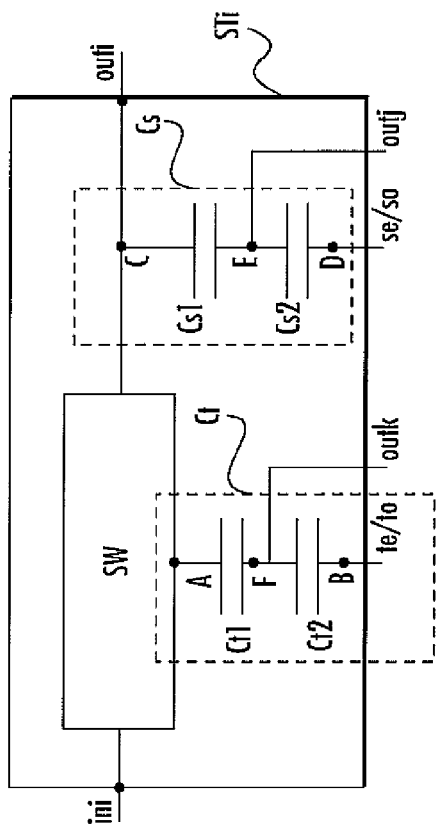
FIG. 4A is a functional block diagram of a further critical multiplication stage according to an embodiment of the present invention.

As shown in FIG. 4A it may be advantageous to replace the conditioning capacitor of the generic critical stage STi with two additional capacitors Ct1 and Ct2 connected in series and sharing a further intermediate terminal F, similar to that described above in relation to the pumping capacitor Cs.

Figure 4B:
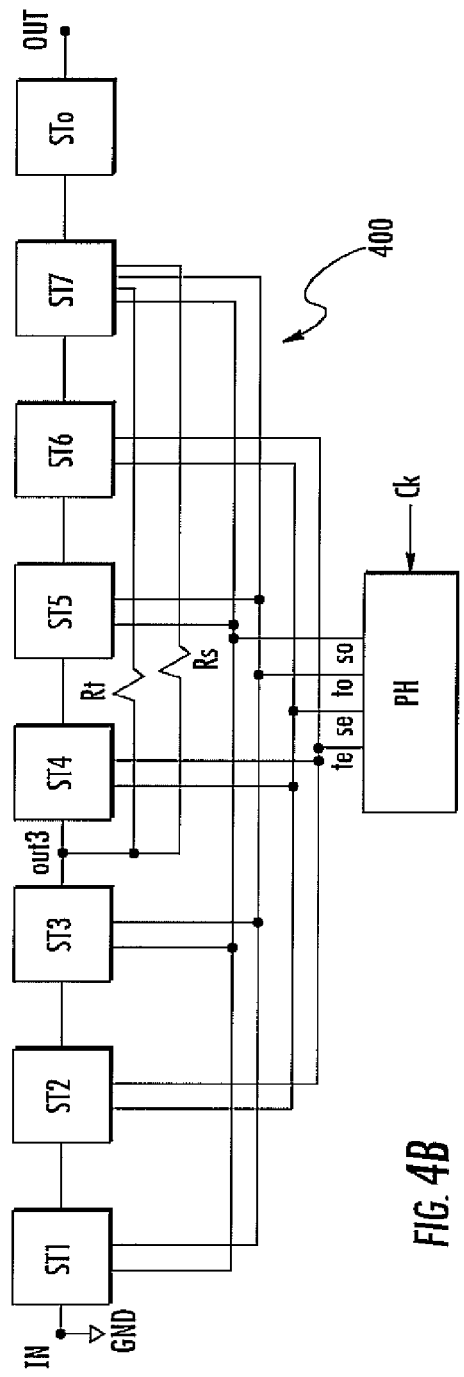
FIG. 4B is a schematic circuit diagram of a further charge pump according to one embodiment of the present invention.

Referring additionally to FIG. 4B, which shows a charge pump 400 according to another embodiment, via a further resistor Rt, it may be possible to connect the further intermediate terminal F to the output terminal outk—where the index k is defined as an odd or even according to whether the index i is an odd or even number, respectively (with, k<i)—of a further previous multiplication stage STk in even or odd position according to whether the critical multiplication stage STi occupies an even or odd position in the cascade, respectively.

In the charge pump 400 the index k has been selected sot that k=3. Consequently, the resistor Rt connects the output out3 of the previous multiplication stage ST3 and through a second terminal to the terminal F the capacitor Ct of the seventh stage ST7.

Similar to what is described above for the capacitors Cs1 and Cs2, by imposing the pump voltage Vout3($t$) to the further intermediate terminal F, the potential drop $\Delta$Vt on the capacitors Ct1 and Ct2 is divided in two corresponding potential drops $\Delta$Vt1 and $\Delta$Vt2, respectively, lower than the maximum potential drop value $\Delta$VM may be ensured. In this way, the same advantages mentioned above for the pumping capacitor Cs may also be obtained for the transfer capacitor Ct of the critical stage of ST7.

The approach presented here is extendable through its embodiments to charge pumps including more than one critical stage (i.e., multiplication stages wherein between the terminals of the pumping and conditioning capacitors, a potential drop higher in value than the maximum value may be developed). In particular, the pumping and conditioning capacitors of each critical stage may be formed in the manner described with reference to FIG. 4A, i.e., may be formed by two capacitors in series, and the intermediate terminals may be connected, through respective resistors, to the output terminal of a preceding stage in the cascade and in phase synchrony with the respective critical stage (i.e. in even or odd position according to whether the corresponding critical stage is in even or odd position, respectively), so as to include the potential drops between the terminals of the capacitors lower than the maximum potential drop value, as above described.

It may also be possible to provide embodiments wherein the pumping and conditioning capacitors are formed by more than two capacitors in series. In this case, each intermediate terminal shared between two of such capacitors in series may be connected by a corresponding resistor, to an output terminal of a previous stage in the cascade synchronous with the critical stage to have potential drop values lower than the maximum potential drop value between the terminals of each capacitor in series, thus obtaining the same benefits as described above.

The approach according to the present embodiments are not limited to negative charge pumps, but may be applicable to positive charge pumps as well without departing from the teachings associated with the present invention. It may also be is possible to provide a charge pump wherein the capacitor(s) in the critical stage(s) do not undergo intensive stresses, prolonging the useful life thereof and, consequently, the useful life of the charge pump as a whole.

To satisfy local and specific requirements, a person skilled in the art may apply to the approach described above, many logical and/or physical modifications and alterations. More specifically, although this approach has been described with a certain degree of particularity with reference to one or more embodiments thereof, it should be understood that various omissions, substitutions and changes in the form and details as well as other embodiments are possible. Particularly, different embodiments may even be practiced without the specific details (such as, the numerical examples) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

It should be readily apparent that the proposed structure might be part of the design of an integrated device. The design may also be created in a programming language. In addition, if the designer does not manufacture the integrated device or its masks, the design may be transmitted through physical means to others. The resulting integrated device may be distributed by its manufacturer in the form of a raw wafer, as a naked chip, or in packages. Moreover, the proposed structure may be integrated with other circuits in the same chip, or it may be mounted in intermediate products (such as motherboards) and coupled with one or more other chips (such as, a processor). In any case, the memory device is configured to be used in complex systems (such as automotive applications or microcontrollers).

That which is claimed:

1. A voltage booster device comprising:
  a plurality of multiplication stages arranged in a sequence, each having an input terminal coupled to an output terminal of a next multiplication stage with the exception of a first multiplication stage and each of the plurality of multiplication stages comprising pumping circuitry configured to accumulate an electric charge based upon a pump voltage value of the multiplication stage;
  said pumping circuitry in at least one of said plurality of multiplication stages comprising
    a plurality of charge accumulators coupled in series,
    a terminal between said plurality of charge accumulators, and
    biasing circuitry coupling the terminal to an output terminal of a previous multiplication stage in the sequence and configured to force operation of said plurality of charge accumulators within a threshold potential drop value; and
  a phase signal generation circuit configured to switch operation of the plurality of multiplication stages between a transfer phase and a maintaining phase such that multiplication stages located in an even position in the sequence operate in the transfer phase when multiplication stages located in an odd position in the sequence operate in the maintaining phase, and vice-versa.

2. The voltage booster device according to claim 1, wherein at least one of said plurality of multiplication stages further comprises:
  a switching circuit configured to switch the at least one of said plurality of multiplication stages between the maintaining phase and the transfer phase; and
  conditioning circuitry configured to adapt a transfer signal provided by said phase signal generation circuit to said switching circuit;
  said conditioning circuitry comprising a plurality of further charge accumulators coupled in series, a further terminal coupled between said plurality of further charge accumulators, and further biasing circuitry coupled to the output terminal of the previous multiplication stage in the sequence and configured to force operation of said plurality of further charge accumulators within the threshold potential drop value.

3. The voltage booster device according to claim 2, wherein said plurality of further charge accumulators comprises a plurality of further capacitors.

4. The voltage booster device according to claim 1, wherein said phase signal generation circuit is configured to synchronously provide a first transfer signal to each of said plurality of multiplication stages in an odd position for starting the transfer phase, and synchronously provide a second transfer signal to each multiplication stage of said plurality of multiplication stages in an even position for starting the transfer phase, the first transfer signal being asserted when the second transfer signal is de-asserted and vice-versa.

5. The voltage booster device according to claim 1, wherein said phase signal generation circuit is configured to synchronously provide a first accumulation signal to each multiplication stage of said plurality of multiplication stages in an odd position during the transfer phase, and synchronously provide a second accumulation signal to each multiplication stage of said plurality of multiplication stages in an even position during the transfer phase, the first accumulation signal being asserted when the second accumulation signal is de-asserted and vice-versa.

6. The voltage booster device according to claim 1, wherein said plurality of charge accumulators comprises a plurality of capacitors.

7. The voltage booster device according to claim 1, wherein the voltage booster device comprises a negative charge pump.

8. The voltage booster device according to claim 1, wherein the voltage booster device comprises a positive charge pump.

9. A charge pump comprising:
   a plurality of multiplication stages arranged in an input-to-output sequence and comprising pumping circuitry configured to accumulate an electric charge based upon a pump voltage;
   said pumping circuitry in at least one of said plurality of multiplication stages comprising
      a plurality of charge accumulators coupled in series,
      a terminal between said plurality of charge accumulators, and
      biasing circuitry coupling the terminal to a previous multiplication stage in the sequence and configured to force operation of said plurality of charge accumulators within a threshold potential drop value; and
   a phase signal generation circuit configured to switch operation of the plurality of multiplication stages between a transfer phase and a maintaining phase.

10. The charge pump according to claim 9, wherein at least one of said plurality of multiplication stages further comprises:
   a switching circuit configured to switch the at least one of said plurality of multiplication stages between the maintaining phase and the transfer phase; and
   conditioning circuitry configured to adapt a transfer signal provided by said phase signal generation circuit to said switching circuit;
   said conditioning circuitry comprising a plurality of further charge accumulators coupled in series, and further biasing circuitry coupled to the previous multiplication stage in the sequence and configured to force operation of said plurality of further charge accumulators within the threshold potential drop value.

11. The charge pump according to claim 10, wherein said plurality of further charge accumulators comprises a plurality of further capacitors.

12. The charge pump according to claim 9, wherein said phase signal generation circuit is configured to synchronously provide a first transfer signal to each of said plurality of multiplication stages in an odd position for starting the transfer phase, and synchronously provide a second transfer signal to each multiplication stage of said plurality of multiplication stages in an even position for starting the transfer phase, the first transfer signal being asserted when the second transfer signal is de-asserted and vice-versa.

13. The charge pump according to claim 9, wherein said phase signal generation circuit is configured to synchronously provide a first accumulation signal to each multiplication stage of said plurality of multiplication stages in an odd position during a transfer phase, and synchronously provide a second accumulation signal to each multiplication stage of said plurality of multiplication stages in an even position during the transfer phase, the first accumulation signal being asserted when the second accumulation signal is de-asserted and vice-versa.

14. The charge pump according to claim 9, wherein said plurality of charge accumulators comprises a plurality of capacitors.

15. A method for forcing operation of charge accumulators to a threshold potential drop value in a voltage booster device, the method comprising:
   providing a plurality of multiplication stages arranged in a sequence, each having an input terminal coupled to an output terminal of the next multiplication stage with the exception of a first multiplication stage and each of the plurality of multiplication stages comprising pumping circuitry configured to accumulate an electric charge based upon a pump voltage value of the multiplication stage;
   providing the plurality of multiplication stages comprising providing at least one of the plurality of multiplication stages so that the pumping circuitry comprises a plurality of charge accumulators connected in series, and a shared terminal between the plurality of charge accumulators;
   providing a phase signal generation circuit configured to switch operation of the plurality of multiplication stages between a transfer phase and a maintaining phase such that multiplication stages located in an even position in the sequence operate in the transfer phase when multiplication stages located in an odd position in the sequence operate in the maintaining phase, and vice-versa; and
   supplying the shared terminal with an output potential of a previous multiplication stage.

16. The method according to claim 15, wherein providing at least one of the plurality of multiplication stages further comprises:
   providing a switching circuit to switch the at least one of the plurality of multiplication stages between the maintaining phase and the transfer phase; and
   providing conditioning circuitry to adapt a transfer signal provided by the phase signal generation circuit to the switching circuit;
   the conditioning circuitry comprising a plurality of further charge accumulators coupled in series, a further terminal coupled between the plurality of further charge accumulators, and a further biasing circuitry coupled to the output terminal of the previous multiplication stage in the sequence and configured to force operation of the plurality of further charge accumulators within the threshold potential drop value.

17. The method according to claim 16, wherein the previous multiplication stage and the further previous multiplication stage are corresponding.

18. The method according to claim 16, wherein the plurality of further charge accumulators comprises a plurality of further capacitors.

19. The method according to claim 15, wherein the phase signal generation circuit synchronously provides a first transfer signal to each of the plurality of multiplication stages in an odd position for starting the transfer phase, and synchronously provides a second transfer signal to each multiplication stage of the plurality of multiplication stages in an even position in for starting the transfer phase, the first transfer signal being asserted when the second transfer signal is de-asserted and vice-versa.

20. The method according to claim 15, wherein the phase signal generation circuit synchronously provides a first accumulation signal to each multiplication stage of the plurality of multiplication stages in an odd position during the transfer phase, and synchronously provides a second accumulation signal to each multiplication stage of the plurality of multiplication stages in an even position during the transfer phase, the first accumulation signal being asserted when the second accumulation signal is de-asserted and vice-versa.

21. The method according to claim 15, wherein the plurality of charge accumulators comprises a plurality of capacitors.

22. A method of operating a charge pump comprising a plurality of multiplication stages arranged in an input-to-output sequence and comprising pumping circuitry configured to accumulate an electric charge based upon a pump voltage, and a phase signal generation circuit configured to switch operation of the plurality of multiplication stages between a transfer phase and a maintaining phase, the method comprising:
    operating a plurality of charge accumulators coupled in series in the pumping circuitry of at least one of the plurality of multiplication stages; and
    operating biasing circuitry coupling between the plurality of charge accumulators to a previous multiplication stage in the sequence to force operation of the plurality of charge accumulators within a threshold potential drop value.

23. The method according to claim 22, further comprising:
    operating, in at least one of the plurality of multiplication stages, a switching circuit to switch the at least one of the plurality of multiplication stages between the maintaining phase and the transfer phase, in at least one of the plurality of multiplication stages; and
    operating, in at least one of the plurality of multiplication stages, conditioning circuitry to adapt a transfer signal provided by the phase signal generation circuit to the switching circuit by at least
        operating a plurality of further charge accumulators coupled in series, and
        operating further biasing circuitry coupled to the previous multiplication stage in the sequence to force the plurality of further charge accumulators within a threshold potential drop value.

24. The method according to claim 23, wherein operating the plurality of further charge accumulators comprises operating a plurality of further capacitors.

25. The method according to claim 22, wherein the phase signal generation circuit synchronously provides a first transfer signal to each of the plurality of multiplication stages in an odd position for starting the transfer phase, and synchronously provides a second transfer signal to each multiplication stage of the plurality of multiplication stages in an even position for starting the transfer phase, the first transfer signal being asserted when the second transfer signal is de-asserted and vice-versa.

26. The method according to claim 22, wherein the phase signal generation circuit synchronously provides a first accumulation signal to each multiplication stage of the plurality of multiplication stages in an odd position during the transfer phase, and synchronously provides a second accumulation signal to each multiplication stage of the plurality of multiplication stages in an even position during the transfer phase, the first accumulation signal being asserted when the second accumulation signal is de-asserted and vice-versa.

27. The method according to claim 22, wherein operating the plurality of charge accumulators comprises operating a plurality of capacitors.

\* \* \* \* \*